US007792533B2

(12) United States Patent
Grandblaise et al.

(10) Patent No.: US 7,792,533 B2
(45) Date of Patent: Sep. 7, 2010

(54) RESOURCE EXCHANGE DISCOVERY IN A CELLULAR COMMUNICATION SYSTEM

(75) Inventors: David Grandblaise, Paris (FR); Remy Pintenet, Le Mesnil le Roi (FR)

(73) Assignee: Motorola, Inc., Schaumburg, IL (US)

( * ) Notice: Subject to any disclaimer, the term of this patent is extended or adjusted under 35 U.S.C. 154(b) by 206 days.

(21) Appl. No.: 12/298,223

(22) PCT Filed: Apr. 19, 2007

(86) PCT No.: PCT/US2007/066954

§ 371 (c)(1),
(2), (4) Date: Oct. 23, 2008

(87) PCT Pub. No.: WO2007/130787

PCT Pub. Date: Nov. 15, 2007

(65) Prior Publication Data

US 2009/0161614 A1     Jun. 25, 2009

(30) Foreign Application Priority Data

May 3, 2006     (EP)     ................................. 06300435

(51) Int. Cl.
*H04W 72/00* (2009.01)
(52) U.S. Cl. ..................... 455/450; 455/451; 455/452.1; 455/452.2; 455/453
(58) Field of Classification Search .................. 455/450, 455/451, 452.1, 452.2, 453
See application file for complete search history.

(56) References Cited

U.S. PATENT DOCUMENTS

| 5,761,621 | A | 6/1998 | Sainton et al. | |
| 7,512,089 | B2 * | 3/2009 | Wybenga et al. | ............ 370/328 |
| 2002/0141360 | A1 | 10/2002 | Baba et al. | |

| 2002/0191561 | A1 | 12/2002 | Chen et al. |

(Continued)

FOREIGN PATENT DOCUMENTS

EP     1220557 A1     3/2002

(Continued)

OTHER PUBLICATIONS

Norman Muller, "European Search Report," European Patent Office, Munich, Oct. 13, 2006.

(Continued)

*Primary Examiner*—Joseph H Feild
*Assistant Examiner*—Huy D Nguyen (57) ABSTRACT

A cellular communication system comprises a set of base stations (201,203) which transmit downlink resource exchange discovery messages to remote terminals in resource allocations of a Media Access Control, MAC, frame structure. The discovery messages may indicate that a base station has resource available for reallocation to another base station or that a base station is seeking resource to be allocated from another base station. A remote terminal (205) comprises a receiver (401, 403) which receives a first message of the downlink resource exchange discovery messages from at least a first base station (201). A discovery message transmit processor (407) generates a second message, which is an uplink resource exchange message comprising resource exchange data determined from the first message, and transmits this to a second base station (203). The second base station (203) then initiates a temporary air interface resource reallocation with the first base station in response to receiving the second message.

9 Claims, 6 Drawing Sheets

U.S. PATENT DOCUMENTS

| | | | |
|---|---|---|---|
| 2004/0057400 A1* | 3/2004 | Walsh et al. | 370/329 |
| 2006/0205422 A1* | 9/2006 | Hyslop et al. | 455/509 |
| 2009/0129334 A1* | 5/2009 | Ma et al. | 370/331 |
| 2009/0161614 A1* | 6/2009 | Grandblaise et al. | 370/329 |
| 2010/0067467 A1* | 3/2010 | Cho et al. | 370/329 |

FOREIGN PATENT DOCUMENTS

| | | | |
|---|---|---|---|
| EP | 1437667 A1 | 7/2004 | |
| EP | 1742427 A2 | 1/2007 | |
| EP | 1742497 B1 | 10/2008 | |

OTHER PUBLICATIONS

WIPO-ISA/US, "International Search Report and Written Opinion," May 30, 2008.

Mitola, "Cognitive Radio for Flexible Mobile Multimedia Communications," IEEE International Workshop on Mobile Multimedia Communications, 1999 (MoMuC '99), pp. 3-10.

Capar, et al., "Spectrum Pricing for Excess Bandwidth in Radio networks," 15th IEEE International Symposium on Personal, Indoor and Mobile Radio Communications, 2004 (PIMRC 2004), vol. 4, Sep. 5-8, 2004, pp. 2458-2462.

Rodriguez, et al., "Auction Driven Dynamic Spectrum Allocation: Optimal Bidding, Pricing and Service Priorities for Multi-Rate, Multi-Class CDMA," IEEE 16th International Symposium on Personal, Indoor and Mobile Radio Communications, 2005 (PIMRC 2005), vol. 3, Sep. 11-14, 2005, pp. 1850-1854.

Kloeck, et al., "Auctions Sequence as a New Spectrum Allocation Mechanism," INT Universitat Karlsruhe, 14th 1ST Mobile & Wireless Communications Summit, Dresden, Germany, Jun. 19-23, 2005, 5 pages.

Goldhammer, "Detailed Scope of IEEE 802.16h Standard," IEEE 802.16h-05/003, Session # 35, Tel Aviv, Israel, Jan. 24-27, 2005, 12 pages.

Cordeiro, et al., "IEEE 802.22: An Introduction to the First Wireless Standard based on Cognitive Radios," Journal of Communications, vol. 1, No. 1, Apr. 2006, 10 pages.

* cited by examiner

FIG. 1

Ci,j : cell #j operated by operator #i

RESOURCE EXCHANGE DISCOVERY IN A CELLULAR COMMUNICATION SYSTEM

FIELD OF THE INVENTION

The invention relates to resource exchange discovery in a cellular communication system and in particular, but not exclusively, to resource exchange for IEEE 802.16 networks or IEEE 802.22 networks.

BACKGROUND OF THE INVENTION

In the last decades, wireless communication systems have become ubiquitous. For example, cellular communication systems such as mobile communication systems, broadband Wireless Metropolitan Area Networks (WMAN) and wireless Local Area Networks (WLANs) have become widespread as a means to provide efficient communication services to e.g. mobile communication units. However, the increased prevalence of wireless communication systems have resulted in a dramatically increased need for air interface resources and the need for efficiently and flexibly utilising the available resource has become essential for the further development of wireless systems.

A method that has been proposed for effectively increasing the utilisation of air interface resource is spectrum sharing wherein a number of independent networks may share the same frequency spectrum. The frequency spectrum may be shared by time division wherein the individual networks are allocated distinct time intervals for transmission.

However, a static allocation of resource to different networks will typically not result in an optimal utilisation of the available resource as the resource requirements for individual networks tend to vary dynamically. However, current approaches for dynamic allocation of a shared air interface resource to individual networks tend to be complex, result in suboptimal resource sharing and suboptimal performance for the individual networks.

Specifically, space time varying spectrum usage leads to a desire for dynamic spectrum sharing between several radio access systems operated by same or different operators in the same geographical area. For example, a given air interface resource may typically be divided by allocating a fixed amount of resource to each system and/or cell. However, if a given cell or system does not fully utilise the allocated resource it is desirable for this resource to be temporarily re-allocated to a different system or cell. Such, dynamic reallocation may for example be achieved by a process wherein a primary cell having unused resource can offer the resource to other cells. Such secondary cells may for example bid for the resource such that the resource can be temporarily re-allocated to one or more secondary cells depending on the offers received from the different cells or systems.

Figure 1:
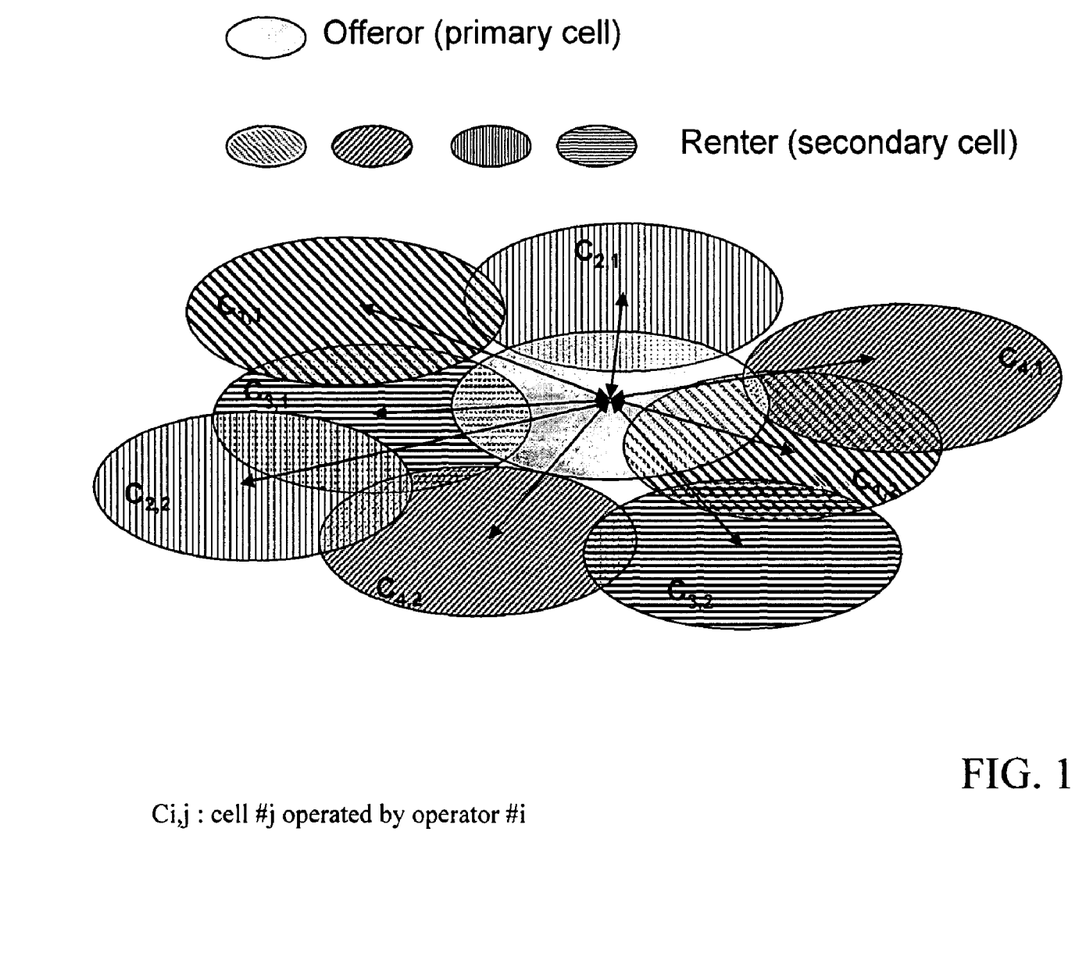
FIG. 1 illustrates an example of a communication system employing resource exchange.

In this manner, resource such as frequency spectrum resource, time interval resource or code resource can be dynamically and temporally reused for a secondary usage by secondary systems or cells when not used by the primary ones. In particular, such resource sharing can be approached at the multi cells level where a primary cell (offeror) can temporally allow the renting of radio resource to one or more secondary cells (renters) requesting more radio resource. An example of such a cellular system is illustrated in FIG. 1.

This sharing between the cells can be achieved through the sharing of an air interface MAC frame structure in a co-existence neighbourhood. Thus, a dynamic, real time and distributed rental protocol between the cells can be used at the MAC level. The radio resource scheduling between competing secondary cells can be handled with a rental protocol combined with auctioning inspired mechanisms. An example of such a system can for example be found in [D. Grandblaise, K. Moessner, G. Vivier, R. Tafazolli, "Credit token based scheduling for inter BS Spectrum Sharing", 4th Karlsruhe Workshop on Software Radios (WSR'06), Karlsruhe, Germany, 22-23 Mar. 2006.

Such an approach enables a self of governance radio resource allocation between cells. However, the implementation of e.g. such rental mechanisms requires efficient mechanisms for the involved base stations to exchange information of available and desired resource.

Such information exchange is generally cumbersome and unreliable in many communication systems. For example, the communication may be achieved via a fixed network interconnecting all the base stations, but this tends to substantially increase the communication resources required from the interconnecting network thereby increasing cost of implementation and operation. Furthermore, such an approach tends to be very inflexible for example when different systems do not know each other and do not have wired interconnections to communicate.

Another option is for all base stations to have a direct physical RF link with e.g. all neighbour base stations. However, this may not always be possible (due to long distance and/or bad radio propagation conditions), can be complex and/or may require additional circuitry in the base stations thereby increasing size and cost. It is furthermore inflexible and cumbersome to upgrade, for example if a new base station is introduced.

Hence, an improved communication system would be advantageous and in particular a system allowing improved support for resource sharing and in particular providing increased flexibility, facilitated implementation, reduced complexity, reduced cost, improved resource sharing, increased capacity and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a cellular communication system comprising: a set of base stations arranged to transmit downlink resource exchange discovery messages to remote terminals in resource allocations of a Media Access Control, MAC, frame structure; at least one remote terminal comprising: means for receiving a first message of the downlink resource exchange discovery messages from at least a first base station of the set of base stations; means for generating a second message being an uplink resource exchange message comprising resource exchange data determined from the first message; and means for transmitting the second message to a second base station; and wherein the second base station is arranged to initiate a temporary air interface resource reallocation with the first base station in response to receiving the second message.

The invention may allow improved resource sharing and/or an improved resource utilisation. An efficient management of resource sharing may be achieved. All or some of a nominal resource allocation for one base station may temporarily be reassigned to another base station (or to a plurality of other base stations) in a practical and efficient way. In particular, an efficient dissemination of information of resource availability and requirements can be achieved thereby allowing resource exchange to be achieved. The invention allows this information to be communicated using reliable and/or low complexity mechanisms.

The invention may in particular allow efficient spectrum reuse opportunities by providing the efficient means to identify/detect the free/available resources for sharing. The invention may allow low complexity operation and low complexity equipment to be used. Specifically, much functionality used for communicating data may be reused to support a resource exchange mechanism.

The first and second base station may for example be base stations of the same network operated by the same operator or may e.g. be base stations of different networks or access systems which may e.g. employ independent resource allocation of the allocated air interface allocation and/or may be independently managed and controlled. The communication networks may for example be Orthogonal Frequency Division Multiple Access systems. For example, the communication networks may include Wireless Local Area Networks (WLANs) such as IEEE 802.11 networks or broadband wireless radio access systems such as IEEE 802.16 networks or Wireless Regional Area Networks (WRANs) such as IEEE 802.22 networks. The first and second base stations may use the same access technology or may use different access technologies. For example, one base station may comply with an IEEE 802.11 standard whereas the other base station complies with an IEEE 802.16 standard.

The invention may be applied to both licensed and unlicensed systems.

The invention may in some embodiments enable or facilitate spectrum sharing in a distributed and real time way. In particular, it may provide the mechanisms for spectrum sharing between base stations using a peer-to-peer arrangement.

According to an optional feature of the invention, the first base station is a base station having available air interface resource for other base stations and the first message is a discovery message comprising an indication of the available air interface resource.

The invention may provide an efficient way of disseminating information of available air interface resource for resource sharing to other base stations.

According to an optional feature of the invention, the second base station comprises means for transmitting a resource evaluation command to the first remote terminal; the first remote terminal comprises means for determining a resource evaluation criterion in response to the resource evaluation command; and the means for transmitting is arranged to transmit the second message only if the available air interface resource meets the resource evaluation criterion.

This may allow improved operation and/or performance. In particular, the feature may allow reduced communication requirements and/or may facilitate and/or reduce complexity of the operation performed by the second base station. In particular it may allow lower overhead signalling over the air interface.

The resource evaluation criterion may e.g. be complex algorithm or simple comparison such as a comparison of a resource parameter to a specific threshold. The resource evaluation command may be a simple command indicating one resource evaluation criteria from a range of predetermined resource evaluation criterions or may e.g. be a complex resource evaluation algorithm. For example, the resource evaluation command may be a downloadable executable code and/or may be a set of parameters and/or requirements defining a specific evaluation policy.

According to an optional feature of the invention, the first base station is a base station requesting available air interface resource from other base stations and the first message is a discovery message comprising an indication of the requested air interface resource.

The invention may provide an efficient way of disseminating information of air interface resource requirements or desires for resource sharing from a base station seeking to be provided with a temporary additional allocation of air interface to other base stations.

According to an optional feature of the invention, the first and second base station are arranged to effect the temporary air interface resource reallocation through a negotiation process based on communication using a fixed network interconnecting at least the first and second base station.

This may provide an efficient implementation and may in particular provide an optimised usage of communication opportunities at the different phases of a resource reallocation process. Specifically, an efficient and distributed dissemination of discovery messages in a system may be combined with a reliable, focused and targeted process for executing the resource exchange. For example, the feature may allow an efficient resource reallocation to be supported by a centralised server in the fixed network while maintaining low communication requirements for the fixed network.

The first and second base station may specifically be arranged to negotiate via a centralised server. The fixed network may be a core network and/or a backhaul network connecting the base stations by semi-permanent (existing for longer durations than typical calls) communication links.

According to an optional feature of the invention, the remote terminal is arranged to receive downlink resource exchange discovery messages from non-serving base stations.

This may allow a system wherein remote terminals can effectively support resource exchange between different cells.

According to an optional feature of the invention, the MAC frame structure comprises a first number of resource allocations reserved for resource availability messages and a second number of resource allocations reserved for resource request messages.

This may allow facilitated management while ensuring efficient operation. The first and second number may be the same. Each resource allocation may be a time interval reserved for communicating a discovery message.

The downlink resource exchange discovery messages may contain both resource availability messages from base stations with available resource and resource request messages from base stations requesting resource.

The MAC frame structure may be a frame structure shared by the set of base stations and the set of base stations may be frame synchronised to this MAC frame structure.

According to an optional feature of the invention, the MAC frame structure is a repeating MAC frame structure and the cellular communication system further comprises means for setting at least one of the first number and the second number in response to a number of base stations attempting resource exchange.

This may allow improved usage of the resource in the frame structure and may specifically allow the resource usage for discovery messages to be adapted to the current requirements. For example the first number may be determined in response to a number of base stations seeking to provide resource to other base stations and/or in response to a number of base stations seeking to obtain resource from other base stations. Likewise, the second number may be determined in response to a number of base stations seeking to provide resource to other base stations and/or in response to a number of base stations seeking to obtain resource from other base stations.

According to an optional feature of the invention, the cellular communication system further comprises means for determining an allocation of resource slots in the MAC frame structure for downlink resource exchange discovery messages in response to a timing characteristic of the associated air interface resource.

This may allow improved operation and/or more efficient resource utilisation. For example, discovery messages associated with resource allocation beginning at an earlier time may be prioritised higher than discovery messages associated with the resource allocation beginning at a later time.

According to another aspect of the invention, there is provided a method of resource exchange discovery in a cellular communication system; the method comprising: a set of base stations transmitting downlink resource exchange discovery messages to remote terminals in resource allocations of a Media Access Control, MAC, frame structure; at least one remote terminal performing the steps of: receiving a first message of the downlink resource exchange discovery messages from at least a first base station of the set of base stations, generating a second message being an uplink resource exchange message comprising resource exchange data determined from the first message, and transmitting the second message to a second base station; and the second base station initiating a temporary air interface resource reallocation with the first base station in response to receiving the second message.

These and other aspects, features and advantages of the invention will be apparent from and elucidated with reference to the dependent claims and the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME
EMBODIMENTS OF THE INVENTION

The following description focuses on embodiments of the invention applicable to a broadband Wireless Metropolitan Area Network (WMAN) and in particular to an Institute of Electrical Engineers (IEEE) 802.16 standard communication system. However, it will be appreciated that the invention is not limited to this application but may be applied to many other systems including for example WLANs or cellular communication systems such as IEEE 802.22 (WRANs), GSM or UMTS. The invention is applicable to both licensed and unlicensed systems.

Figure 2:
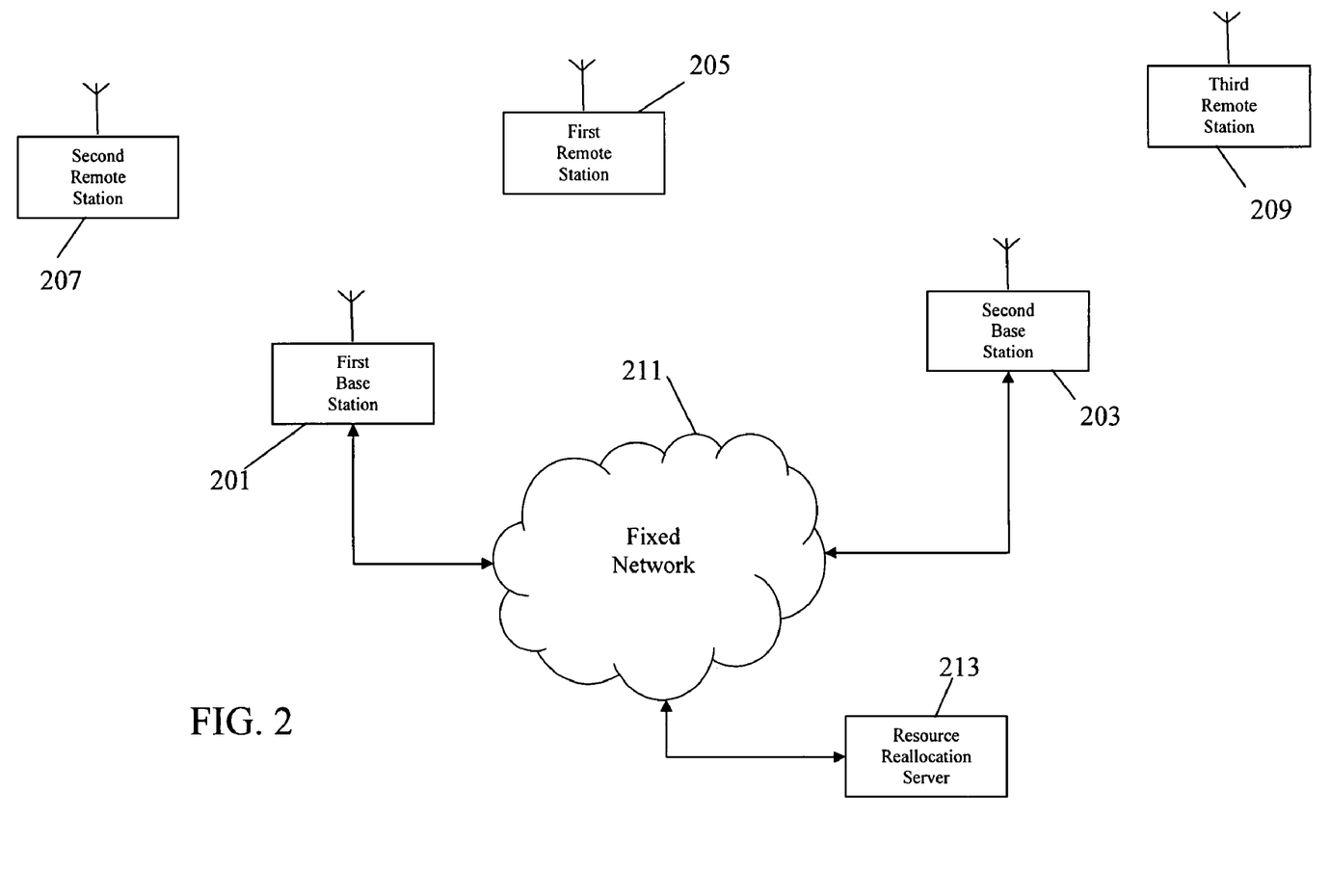
FIG. 2 illustrates an example of a communication system in accordance with some embodiments of the inventions.

FIG. 2 illustrates an example of a communication system in accordance with some embodiments of the inventions.

In the system, a first and second base station 201, 203 support a number of remote stations of which three remote stations 205, 207, 209 are shown. The base stations 201, 203 are specifically WMAN base stations operating in accordance with an IEEE 802.16 standard as will be known to the person skilled in the art.

The base stations 201, 203 are interconnected by a fixed network 211 which allows data to be exchanged between the base stations 201, 203 and which provides a gateway to other networks. Specifically, the fixed network comprises control and management functions for the base stations as well as a gateway to the Internet. Thus, the base stations 201, 203 may specifically provide Internet access for the remote terminals 205-209.

It will be appreciated that in some embodiments, the base stations, remote stations and fixed network may all be part of the same communication network supported by the same operator and using the same access technology. Thus, the cells supported by the individual base stations may be neighbouring cells covering a given area. In other embodiments, the first and second base stations 201, 203 may be part of different networks that are managed by different operators. In such embodiments, the fixed network 211 can comprise two separate networks coupled together by a suitable interface function.

Furthermore, the first and second base stations 201, 203 may use the same access technology or may use different access technologies and may specifically comply with different IEEE wireless network standards based on OFDMA (Orthogonal Frequency Duplex Multiple Access) or any multi carriers based systems.

In the system of FIG. 2, the base stations 201, 203 are IEEE 802.16 base stations which provide wireless Internet access. In the example, each base station supports a relatively large cell providing access to e.g. a metropolitan area. Furthermore, in the example, the first and second base stations 201, 203 belong to different access networks. The different access networks are specifically different Internet access points of networks operated by different operators. In the example, the fixed network 211 thus comprises both the Internet access network of the first network and of the second network. These individual access networks may be coupled directly or may only be coupled e.g. via the Internet and may only have limited shared functionality (such as the resource reallocation functionality described in the following).

In the system of FIG. 2, the different base stations 201, 203 thus provide Internet access to the remote stations 205-209 in different cells which may be partly or fully overlapping. It will be appreciated that although the description of FIG. 2 focuses on two base stations belonging to two different networks, a typical application may involve a larger number of networks and that each network may comprise a larger number of base stations.

In the example of FIG. 2, the different networks employ spectrum sharing wherein the same frequency spectrum is used by the air interface communications of all the networks. In the specific example, the networks use time division such that the networks have access to the full frequency spectrum at different times.

Specifically, the networks are arranged to use the same MAC (Media Access Control) frame structure on the air interface. The networks are furthermore synchronised such that the MAC frames for transmissions over the air interface are frame synchronised.

In the example, each of the networks (base stations) is allocated a nominal resource allocation corresponding to a specified time interval in each frame. Specifically, the downlink (forward link) and uplink (reverse link) MAC frames are divided into three time intervals of equal size with one time interval being allocated to each of the networks (base stations). (In the example, the uplink and downlink communications can use time division duplex or can use frequency division duplex such that different carriers are used for uplink and downlink).

Thus, within an allocated time interval, the appropriate network (base stations) is free to communicate over the air interface but this is not allowed during the time intervals allocated to other networks (base stations).

The individual networks independently manage and control the operation of the networks. Specifically, each of the networks is at any time allocated a given air interface resource and the management of this air interface resource allocation is performed without any consideration of the operation of other networks. Thus, specifically, the allocation of resource to individual calls and base stations in the individual network is performed with consideration of the resource allocated to the network but without consideration of how other communication systems are managing the resource allocated to them.

Although spectrum sharing may allow an efficient sharing of resource, a static allocation is inefficient as it may not take into account the dynamic and different resource requirements of the individual networks.

In the system of FIG. 2, the resource sharing of the common frequency band may be improved by a temporary resource re-allocation of resource from the nominal resource allocation of one network to another network. Specifically, the system of FIG. 2 comprises a resource reallocation server 213 which can temporarily reallocate unused resource from one network (base station) to another network (base station) being in demand of further air interface resource. In particular, if one network (base station) only uses some of the allocated time interval, the time interval allocated to this network (base station) may temporarily be reduced while the time interval allocated to another network (base station) may be increased.

Reallocation of spectra may for example be performed in response to a bidding process wherein networks (base station) requesting more resource bid for available resource from other networks (base station). Thus, a given network or base station may effectively rent air interface resource to another network or base station being more in demand of this resource. A network having available resource may indicate that this resource is available at a certain cost. Another network may then indicate that it is prepared to pay this cost and accordingly the resource reallocation server 213 will reallocate the resource for the specified duration and will record the cost of the exchange. The cost may for example correspond to monetary values or may for example correspond to credit tokens that can be used by the renting network (base station) to rent resource at a later time.

In the following, a cell having available resource which it is offering for reallocation to other cells is denoted as the primary cell whereas the cell in demand of further resource is denoted as a secondary cell.

The described approach enables a self governance radio resource allocation between cells and/or networks. However, implementation of such a system requires discovery procedures allowing the secondary cells to be made aware of the offers of the primary cells and to inform the primary cells that they are looking for additional resource. In the system of FIG. 1, this discovery is achieved using over the air signalling between base stations based on the use of remote terminals as RF (Radio Frequency) bridges between the different cells (base stations).

Specifically, the system of FIG. 1 provides for resource exchange discovery messages to be transmitted in the downlink direction to remote terminals. The messages are transmitted in resource allocations of the common frame synchronised MAC frame structure. Remote terminals which are located within an overlap region between the serving cell and a neighbouring cell from which it receives a downlink discovery message then generates an uplink message which is transmitted to the serving base station. The uplink message contains information of the resource available from or sought by the neighbour base stations and allows the serving base station to determine whether to initiate a temporary resource allocation.

Specifically, the system provides efficient signalling procedures at the MAC level (over the air) enabling the spectrum sharing opportunities discovery. The system provides for specific time intervals, (referred to as Advertisement Time Intervals—ATIs) in the MAC frame to be used for transmitting downlink discovery messages to remote terminals. This may allow primary cells to advertise information of available resource for renting to neighbouring secondary cells. Alternatively or additionally, it may allow secondary cells to inform the surrounding cells about of the desire for additional radio resources to rent.

Figure 3:
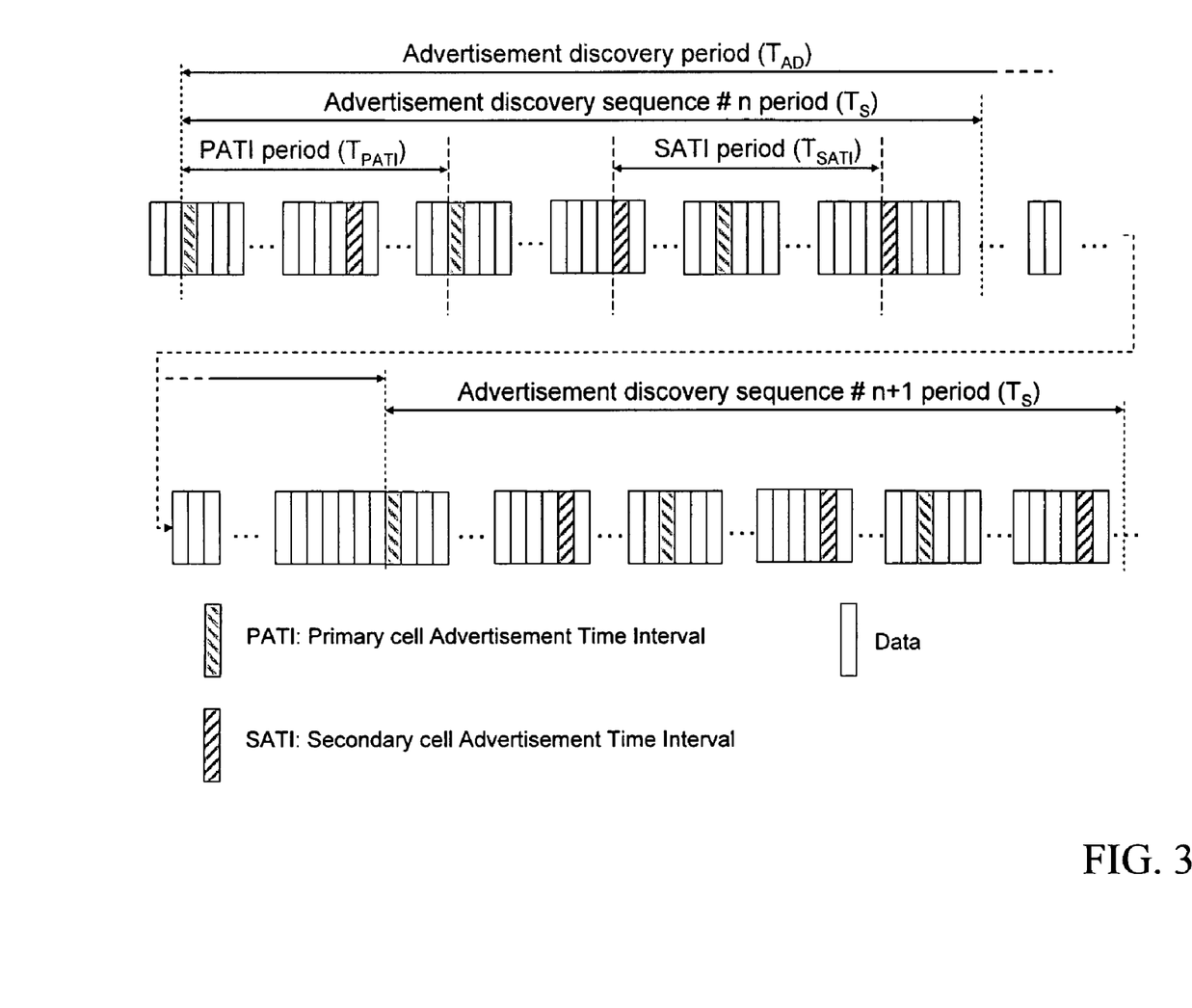
FIG. 3 illustrates an example of a MAC frame in accordance with some embodiments of the inventions.

FIG. 3 illustrates an example of a MAC frame structure employed on a given frequency channel. The figure illustrates an example of a MAC frame structure which enables or facilities discovery of the temporary air interface resource reuse opportunities between the primary and secondary cells. The MAC frame is structured as follows:

An Advertisement discovery sequence is periodically (period $T_S$) inserted in the data frame to support the discovery for two cases:

Discovery of the primary cell's offers by the secondary cells,

Discovery of the secondary cell's requests by the primary cells.

The discovery of the primary cell's offers is enabled by transmitting downlink resource exchange discovery messages in reserved time intervals of the frame structure, henceforth referred to as the Primary Advertisement Time Intervals (PATIs).

The Discovery of the secondary cell's requests is enabled by transmitting downlink resource exchange discovery messages in reserved time intervals of the frame structure, henceforth referred to as Secondary Advertisement Time Interval (SATI).

The number of PATI ($N_{PATI}$) and SATI ($N_{SATI}$) within a given frame repetition can be adjusted in response to the context of the system and specifically in response to the number of primary and/or secondary cells which are currently active. This may allow a more efficient utilisation of the available resource for discovery. For example, in FIG. 3, the number of PATIs and SATIs is the same within the frame structure #n. However, in other examples, there may be different numbers of PATIs and SATIs in a frame repetition. Also, the PATIs and SATIs are not necessary alternately interleaved as depicted in the figure. The total number of PATI+SATI ($N_{PATI}+N_{SATI}$) can be bounded by the average total number of possible neighbours in the co-existence neighbourhood.

Figure 4:
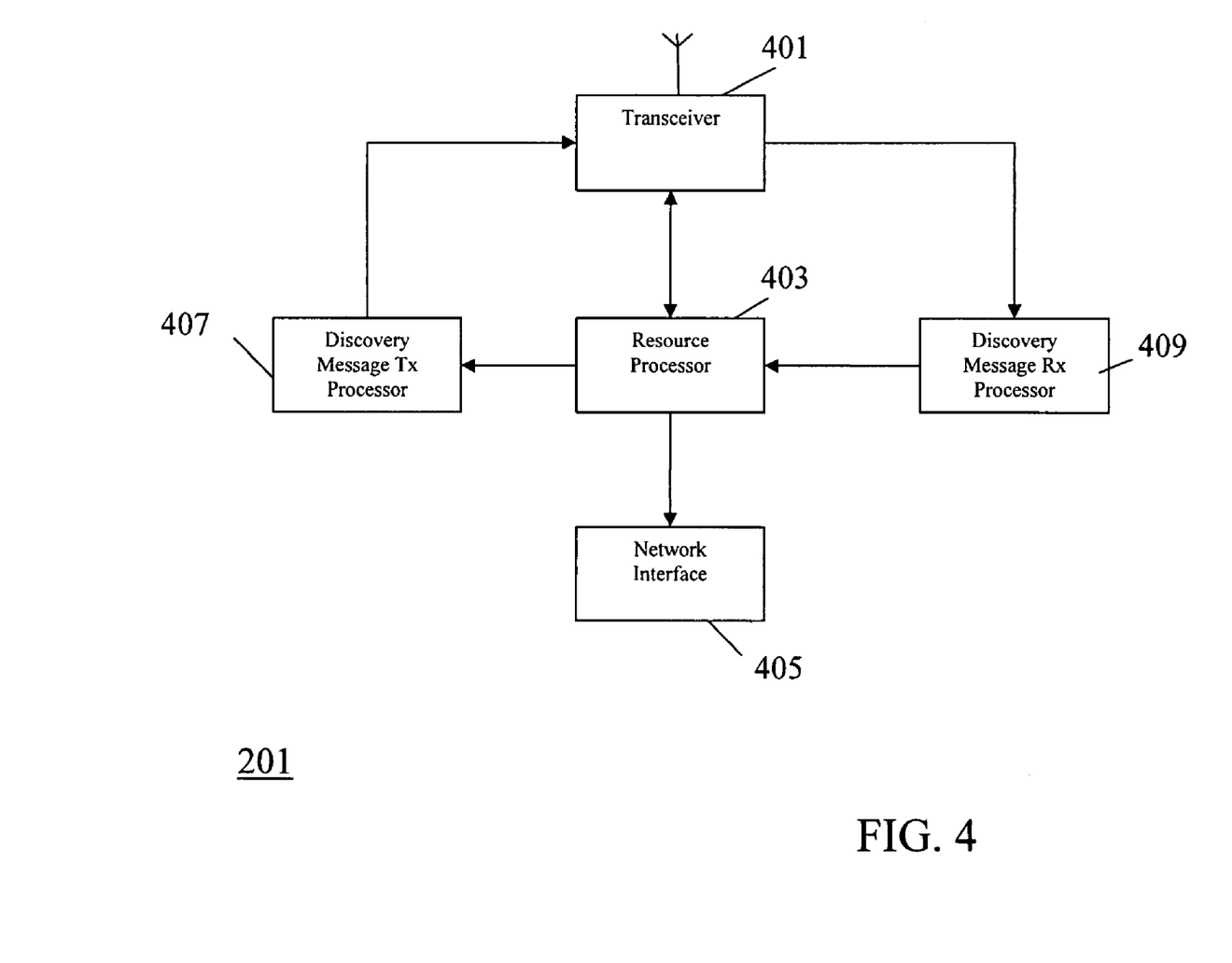
FIG. 4 illustrates an example of a base station in accordance with some embodiments of the inventions.

FIG. 4 illustrates an example of a base station in accordance with some embodiments of the invention. In the specific example, the first and second base stations 201, 203 may be substantially identical and both comprise the functionality illustrated in FIG. 4. Specifically, FIG. 4 will be described with reference to the first base station 201.

The first base stations 201 comprises a transceiver 401 which is arranged to communicate with remote terminals over the air interface of the communication system. Specifically, the transceiver 401 is operable to communicate with remote terminals in accordance with the IEEE 802.16 standard.

The transceiver 401 is coupled to a resource processor 403 which is operable to manage resource allocation for uplink and/or downlink communications to the remote terminals. Specifically, the resource processor 403 comprises functionality for receiving resource requests from remote terminals and allocating time intervals of the MAC frame structure to the remote terminals. It will be appreciated, that although the present description focus on the resource processor 403 being located in the base station 201 some or all of the functionality may in other embodiments be implemented in other elements of the communication system, such as in a base station controller that is part of the fixed network 211.

The resource processor 403 is coupled to a network interface 405 which is capable of communicating with other network elements of the fixed network 211. Specifically the resource processor 403 can receive resource allocations for the cell of the first base station 201 from a resource controller of the fixed network 211. In particular, the resource processor 403 can communicate with the resource reallocation server 213 via the network interface 405.

The resource processor 403 is furthermore coupled to a discovery message transmit processor 407. The resource processor 403 can specifically monitor the current resource usage within the cell of the first base station 201. If the resource processor 403 determines that there is an available resource which is not currently used or likely to be used in the near future, it can determine that this resource can be offered to other cells and/or networks for a temporary reallocation. Accordingly, it provides the discovery message transmit processor 407 with information of the resource availability. In response, the discovery transmit processor 407 generates a downlink resource exchange discovery message in the form of a resource availability message. This message comprises an indication of the resource which is available for rental to other cells.

The discovery message transmit processor 407 is coupled to the transceiver 401 which transmits the resource availability message in a PATI of the MAC frame.

Also, the resource processor 403 may detect that the current resource usage within the cell of the first base station 201 approaches the full capacity and that further air interface resource would be desirable. Accordingly, it may provide an indication of this desire to the discovery message transmit processor 407. In response, the discovery message transmit processor 407 can generate a downlink resource exchange discovery message in the form of a resource request message which is transmitted in a SATI of the MAC frame.

Figure 5:
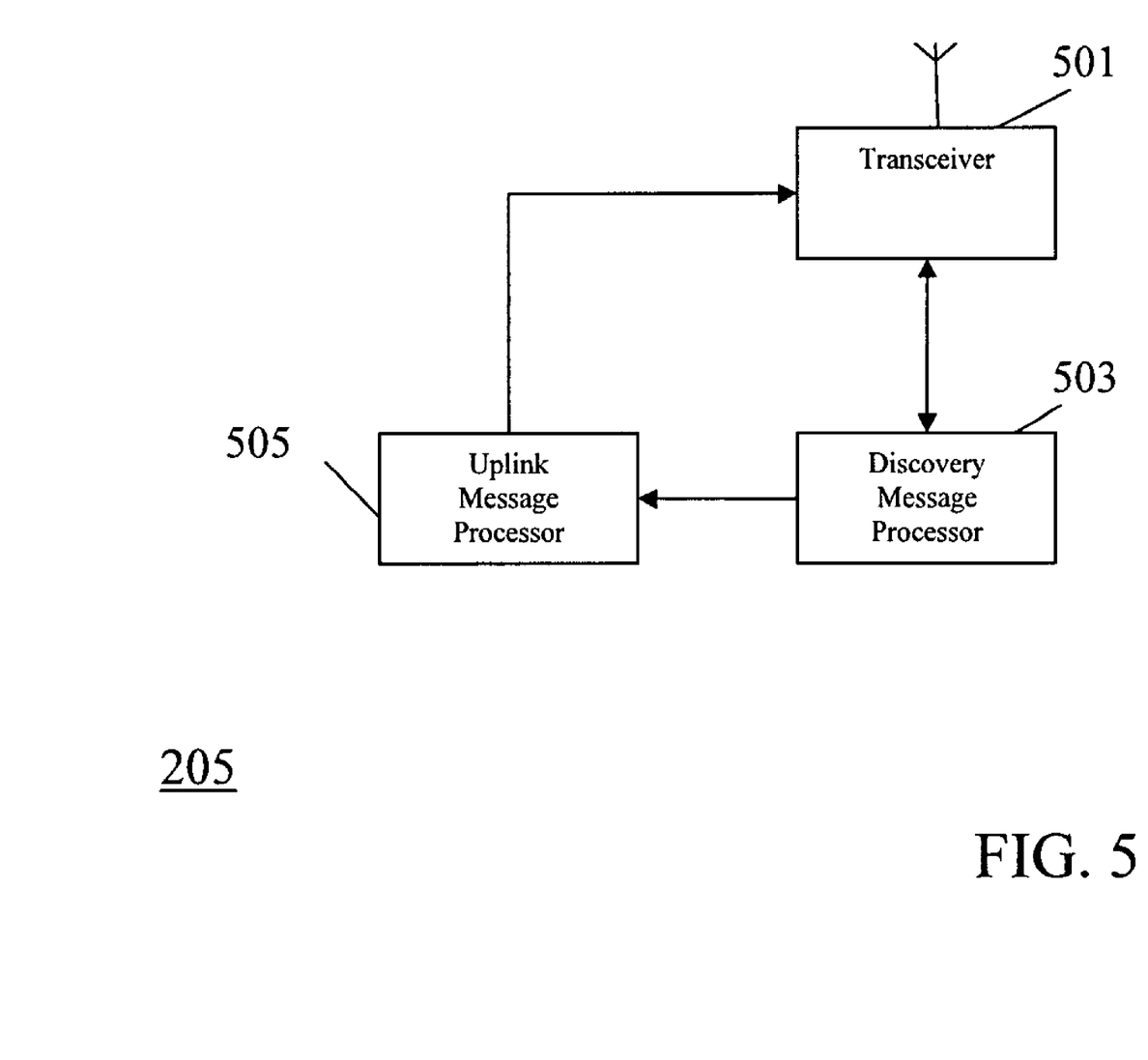
FIG. 5 illustrates an example of a remote terminal in accordance with some embodiments of the inventions.

FIG. 5 illustrates an example of a remote terminal in accordance with some embodiments of the invention. The remote terminal may for example be the first remote terminal 205. In the example, the first remote terminal 205 is in a cell overlap region between the cells of the first and the second base stations 201, 203.

The first remote terminal 201 comprises a transceiver 501 which is arranged to communicate with base stations over the air interface. In particular, the transceiver is capable of communicating over the air interface in accordance with an IEEE 802.16 standard. In addition to communicating with a serving base station, the transceiver can furthermore receive downlink messages from non-serving base stations in at least the SATIs and PATIs.

The transceiver 501 is coupled to a discovery message processor 503 which receives the downlink resource exchange discovery messages from PATIs and SATIs of the MAC frame structure. Specifically, the discovery message processor 503 is forwarded resource available messages and resource request messages received in PATIs and SATIs belonging to other cells and base stations.

The discovery message processor 503 is furthermore coupled to an uplink message processor 505 which is arranged to generate an uplink message to the serving base station. The uplink message comprises information of one or more of the received downlink resource exchange discovery messages. Specifically, the uplink message can comprise an indication of resource availability and/or resource requests that have been received from other base stations.

It will be appreciated, that the uplink message may simply comprise a copy of the data received in one, more or all of the received downlink resource exchange discovery messages. As a simple example, whenever a downlink resource exchange discovery messages is received this may be embedded in an uplink message and transmitted to the serving base station. In other embodiments, the remote terminal may process the information and may generate a more compact uplink message. For example, the uplink message may simply comprise an indication at all the resource availabilities and all the resource requests that have been detected by the remote terminal.

The first base station 201 furthermore comprises a discovery message receive processor 409 which receives the uplink messages from the remote terminals. The discovery message receive processor 409 is coupled to the resource processor 403 which is fed the information of the available and requested resource from other cells/base stations.

Thus, in the described system the functionality of the base stations and remote terminals allow discovery messages relating to resource exchanges to be communicated between the base stations via intermediate remote terminals. The base stations can thereby be provided with information of which other base stations are seeking to temporarily be allocated more resource and which base stations have resource available. The identities of the remote terminals which are allowed to report to their base stations can be specified by the base station before the reporting occurs. This may allow a reduction of the number of reporting remote terminals, and thus can reduce the overhead signalling over the air.

Specifically, when a base station receives an uplink message informing it of a resource availability from another base station, it may proceed to determine if this resource can be used. If so, it can transmit a message to the resource reallocation server 213 identifying the other base station and requesting some or all of this resource. The resource reallocation server 213 can then communicate with the other base station such that a resource reallocation process can be initiated.

Similarly, when a base station receives an uplink message informing it of a resource request from another base station, it may proceed to determine if some or all of this resource can be provided from the resource allocation of the base station. If so, it can transmit a message to the resource reallocation server 213 identifying the other base station and offering some or all of this resource. The resource reallocation server 213 can then communicate with the other base station such that a resource reallocation process can be initiated.

It will be appreciated that any suitable approach for executing the resource re-allocation process may be used without detracting from the invention. For example, the resource reallocation server 213 may operate an auction or bidding process for the available resource allowing interested base stations or networks to apply for the available resource. Such an auction or bidding process may for example be iterative with a number of bidding rounds being executed.

In the following, the operation of the system of FIG. 2 will be clarified by some specific examples.

In the specific system, the PATIs are used in the following manor.

The PATIs are dedicated to a specific primary base station for transmissions in the downlink. The allocation of PATIs to individual base stations may for example be controlled by a base station controller in the fixed network. Each base station seeking to transmit resource availability messages can request the allocation of a PATI from the controller which can allocate an available PATI in response. In some embodiments, the base station controller may be common for base stations of different networks whereas in other embodiments each network can comprise a controller for allocating PATIs within the time interval allocated for that network.

A PATI is used by a primary base station for broadcasting in the downlink direction. At a given time, each PATI can only be used by a single base station among the co-existence neighbourhood. However, the same PATI can be used by a different base station after the previous base station has released the PATI.

Each primary base station can use any PATI provided it is not already used by any other primary base station of the co-existence neighbourhood.

The information in each PATI can specifically include:
  A network address of the first base station. Specifically, the IP address (IPid_P) of the primary base station (or IP proxy address of the primary cell) can be included.
  An identity of the first base station. Specifically, the primary base station identity (BSid_P) can be included.
  An indication of one or more characteristics of the available air interface resource. For example, a starting time of the period opened for renting ($T_{Start\_}P$) by this primary cell on that channel and/or an end time of the period opened for renting ($T_{End\_}P$) by this primary cell on that channel can be included.
  A cost associated with the available air interface resource. For example, a reserved price auctioning cost (RPA_P) expressed in number of credit tokens per radio resource unit on that channel can be included.
  An indication of other available air interface resource. For example a list of other channels on which this primary cell also offers resources for renting can be included.

In the system, the controller for allocating PATIs and SATIs is arranged to allocate the resource slots to the base stations in response to a timing characteristic of the resource being offered or requested for exchange. Specifically, the PATIs are allocated such that the first PATI is assigned to the primary base station whose renting period will occur first (i.e. min of the $T_{Start\_}P$), the second PATI is assigned to the primary base station whose renting period will occur second, and so on. This allocation is updated dynamically each time a new primary base station appears. This mechanism may provide faster resource allocation as secondary cells which require resource urgently can be provided with information of available resource faster.

The controller can furthermore release an allocation of a resource slot in the MAC frame structure (i.e. a PATI or SATI) in response to a current time and a timing characteristic of the resource. Specifically, the PATI of a primary cell is released when the auctioning period starting time of a cell elapses. This enables new arriving primary cells to use this PATI to advertise future spectrum usage opportunities.

Similarly, the SATIs are used in the following manor:

The SATIs are dedicated to a specific secondary base station for transmissions in the downlink. The allocation of SATIs to individual base stations may for example be controlled by the same base station controller and in the same way as for PATIs.

A SATI is used by a secondary base station for broadcasting in the downlink direction. At a given time, each SATI can only be used by a single base station among the co-existence neighbourhood. However, a SATI can be used by a different base station after the previous base station has released the SATI.

Each secondary base station can use any SATI provided it is not already used by any other secondary base station of the co-existence neighbourhood.

The information included in each SATI can specifically include:
  A network address of the base station. Specifically, the IP address (IPid_S) of the secondary base station (or IP proxy address of the secondary cell) can be included.
  An identity of the base station. Specifically, the secondary base station identity (BSid_S) can be included.
  An indication of characteristics of the requested air interface resource. For example, a starting time of the period in which the base station would be interested in renting ($T_{Start\_}S$) by this secondary cell on that channel and/or an end time of the period ($T_{End\_}S$) can be included.
  A cost associated with the requested temporary air interface resource. For example, a maximum price for the resource expressed in number of credit tokens per radio resource unit on that channel can be included.

In the system, the PATI and SATI positions in the MAC frame are referenced by universal time stamps, and these positions are known by the primary and secondary remote terminals where a primary terminal is a terminal belonging to (served by) a primary cell and a secondary terminal is a terminal belonging to (served by) a secondary cell.

In the system there is no direct discovery communications between the primary and secondary base stations. The discovery communications are performed via primary and secondary terminals which act as RF bridges as follows:
  A secondary terminal performs the RF bridge between its secondary base station and the primary base station (provided the coverage of the primary cell overlaps with the secondary cell area, and the secondary terminal is located in the overlapping area).
  A primary terminal performs the RF bridge between its primary base station and the secondary base station (provided the coverage of the secondary cell overlaps with the primary cell area, and the primary terminal is located in the overlapping area).

In the following, an example of the operation of a remote terminal acting as a secondary terminal is described.

In the example, the serving base station can transmit a resource evaluation command to the secondary remote terminal. The secondary remote terminal furthermore comprises functionality for determining a resource evaluation criterion in response to the resource evaluation command. Thus, the secondary base station requesting resource can specify some requirements for the requested resource, such as a timing of the resource. When the remote terminal receives a resource available message in a PATI, it can evaluate the characteristics to determine if these meet the criterion. If so, the uplink message can be transmitted and otherwise no uplink message is generated and transmitted to the secondary base station.

Specifically, during this step, the secondary base station initially instructs (by broadcasting) the remote secondary terminals of the behaviours to adopt when the secondary remote terminals receive the messages from the different PATIs.

In particular, the secondary base station could provide the following evaluation requirements:
(a) The starting ($T_{Start\_}S$) and ending ($T_{End\_}S$) time interval in which this secondary base station is interested in having additional resource allocated. (b) The maximum cost for the resource, such as a maximum reserve price RPAmax_S (expressed in terms of a number of credit tokens number per resources unit). (c) The identities of the remote secondary terminals that are allowed reporting to their secondary base station. These identities can be specified by the secondary base station before the reporting occurs. This allows a reduction of the number of reporting remote secondary terminals, and thus reduces the overhead signalling over the air.

If (a) and (b) are met, the secondary terminals that can receive the PATIs and meet criterion (c) are the only terminals that are allowed to make the RF bridge between the primary and secondary cells. Accordingly, the policy controls the transmissions from any secondary terminal towards the secondary base station when these terminals are mandated to get feedback relating to the PATIs proposals. This mechanism reduces the number of transmissions from the secondary terminals towards the secondary base station when the PATIs do not fit with the secondary base stations strategy thereby saving bandwidth resources.

Subsequently, the secondary terminals in the cell overlap area between the primary cell and the secondary cell monitors the different PATIs sequentially. For each primary cell, the secondary terminals can obtain the following information: IPid_P, BSid_P, $T_{Start\_}P$, $T_{End\_}P$, RPA_P.

Provided the information ($T_{Start\_}P$, $T_{End\_}P$, RPA_P) is received the resource evaluation can be performed. Thus, the secondary terminal is able to decide whether it should forward this information to the secondary base station or not.

If the evaluation criterion is met, the information collected by the secondary terminal is relayed to the secondary cell. The information the secondary terminal sends includes: IPid_P, BSid_P, $T_{Start\_}P$, $T_{End\_}P$ and RPA_P. In order to ensure this information is appropriately received by the secondary base station, the information is sent by several secondary remote terminals. This allows improved reliability and security check.

After receiving the uplink message, the secondary base station has information of the IPid_P and BSid_P of the primary cell. Accordingly, the communications between primary and secondary cells can be performed through the backhaul (the fixed network) in order to instigate the resource re-allocation for example by initiating a negotiation and/or auctioning process. Specifically, the remaining phases of a credit tokens based auctioning/bidding cycle can be performed via this backhaul with IP based communications involving e.g. the resource reallocation server 213.

In the following an example of the operation of a remote terminal acting as a primary terminal is described.

Initially, the primary terminals in the overlapping area between the primary cell and the secondary cell monitor the different SATIs sequentially. For each secondary cell, these primary terminals can obtain the following information: IPid_S, BSid_S and TStart_S.

This information is reported to the serving cell by the primary terminal in an uplink message. In order to ensure that the information is appropriately received by the primary base station, the information is sent by several primary remote terminals.

After receiving the uplink message, the primary base station knows the IPid_P and BSid_P of the secondary cell. Accordingly, the communications between primary and secondary cells can be performed through the backhaul (the fixed network) in order to instigate the resource re-allocation for example by initiating a negotiation and/or auctioning process. Specifically, the remaining phases of a credit tokens based auctioning/bidding cycle can be performed via this backhaul with IP based communications involving e.g. the resource reallocation server.

Figure 6:
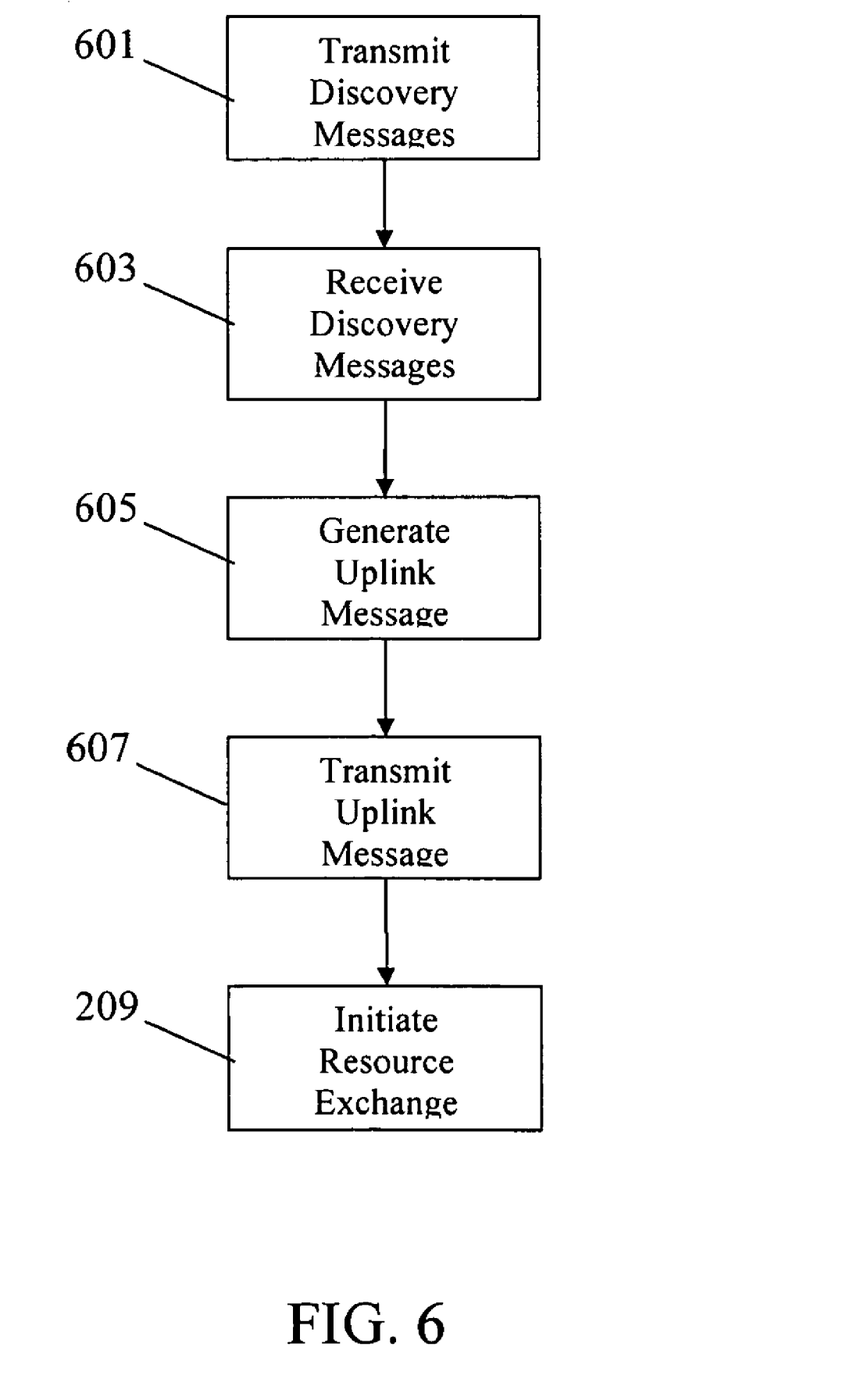
FIG. 6 illustrates an example of a method of resource exchange discovery in accordance with some embodiments of the inventions.

FIG. 6 illustrates a method of resource exchange discovery in the cellular communication system of FIG. 2.

In step 601 a set of one or more base stations 201, 203 transmit downlink resource exchange discovery messages to remote terminals 205-209 in resource allocations of a Media Access Control, MAC, frame structure.

In step 603, which may be simultaneous to step 601, the first remote terminal 205 receives a first message of the downlink resource exchange discovery messages from at least a first base station 201 of the set of base stations.

Step 603 is followed by step 605 wherein the first remote terminal 205 generates a second message which is an uplink resource exchange message that comprises resource exchange data determined from the first message.

Step 605 is followed by step 607 wherein the first remote terminal 205 transmits the second message to a second base station 203.

Step 607 is followed by step 609 wherein the second base station 203 initiates a temporary air interface resource reallocation with the first base station 201 in response to receiving the second message.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A cellular communication system; comprising
a set of base stations arranged to transmit downlink resource exchange discovery messages to remote terminals in resource allocations of a Media Access Control, MAC, frame structure;
at least one remote terminal comprising:
means for receiving a first message of the downlink resource exchange discovery messages from at least a first base station of the set of base stations;
means for generating a second message being an uplink resource exchange message comprising resource exchange data determined from the first message; and
means for transmitting the second message to a second base station; and wherein
the second base station is arranged to initiate a temporary air interface resource reallocation with the first base station in response to receiving the second message.

2. The cellular communication system of claim 1 wherein the first base station is a base station having available air interface resource for other base stations and the first message is a discovery message comprising an indication of the available air interface resource.

3. The cellular communication system of claim 2 wherein the first message comprises an indication of a parameter selected from the group consisting of:
a. a network address of the first base station;
b. an identity of the first base station;
c. an indication of at least one characteristic of the available air interface resource;
d. a cost associated with the available air interface resource; and
e. an indication of other available air interface resource.

4. The cellular communication system of claim 1 wherein the second base station comprises means for transmitting a resource evaluation command to the first remote terminal; the first remote terminal comprises means for determining a resource evaluation criterion in response to the resource evaluation command; and the means for transmitting is arranged to transmit the second message only if the available air interface resource meets the resource evaluation criterion.

5. The cellular communication system of claim 1 wherein the resource evaluation criterion comprises a requirement that at least one characteristic of the available air interface resource of the first message meets a requirement for resource as indicated by the resource evaluation command.

6. The cellular communication system of any of claim 1 wherein the second message comprises an indication of the available air interface resource from the first base station.

7. The cellular communication system of claim 6 wherein the second base station comprises means for transmitting a request for a temporary resource allocation of resource from the first base station to the second base station if the available air interface resource matches a requested air interface resource at the second base station.

8. The cellular communication system of claim 1 wherein the first base station is a base station requesting available air interface resource from other base stations and the first message is a discovery message comprising an indication of the requested air interface resource.

9. A method of resource exchange discovery in a cellular communication system; the method comprising
a set of base stations transmitting downlink resource exchange discovery messages to remote terminals in resource allocations of a Media Access Control, MAC, frame structure;
at least one remote terminal performing the steps of:
receiving a first message of the downlink resource exchange discovery messages from at least a first base station of the set of base stations,
generating a second message being an uplink resource exchange message comprising resource exchange data determined from the first message, and
transmitting the second message to a second base station; and
the second base station initiating a temporary air interface resource reallocation with the first base station in response to receiving the second message.

* * * * *

UNITED STATES PATENT AND TRADEMARK OFFICE
CERTIFICATE OF CORRECTION

PATENT NO. : 7,792,533 B2
APPLICATION NO. : 12/298223
DATED : September 7, 2010
INVENTOR(S) : Grandblaise et al.

It is certified that error appears in the above-identified patent and that said Letters Patent is hereby corrected as shown below:

In Column 14, Line 7, delete "TStart_S." and insert -- $T_{Start\_S}$. --, therefor.

In Column 16, Line 20, in Claim 6, after "system of" delete "any of".

Signed and Sealed this
Seventh Day of August, 2012

David J. Kappos
*Director of the United States Patent and Trademark Office*